United States Patent Office 3,629,450
Patented Dec. 21, 1971

3,629,450
O-(SUBSTITUTED BENZAMIDO) PHENYLACETIC ACIDS AS ANTI-INFLAMMATORY AGENTS
Norbert Gruenfeld, Bronx, and Jan W. F. Wasley, Ossining, N.Y., assignors to Ciba-Geigy Corporation, Ardsley, N.Y.
No Drawing. Application May 27, 1969, Ser. No. 828,344, now Patent No. 3,536,753, which is a continuation-in-part of applications Ser. No. 612,310, Jan. 30, 1967, and Ser. No. 693,143, Dec. 26, 1967, application Ser. No. 693,143, being a continuation-in-part of application Ser. No. 612,310. Divided and this application Jan. 16, 1970, Ser. No. 8,147
Int. Cl. A01n 9/20; A61k 15/12, 27/00
U.S. Cl. 424—319
12 Claims

ABSTRACT OF THE DISCLOSURE

Phenylacetic acid derivatives having a p-substituted benzamido group in the o-position are anti-inflammatory agents. An illustrative embodiment in o-(p-chlorobenzamido)-phenylacetic acid.

CROSS REFERENCE

This is a division of application Ser. No. 828,344, filed May 27, 1969, now U.S. Pat. No. 3,536,753, which is a continuation-in-part of Ser. No. 612,310 and Ser. No. 693,143 filed Jan. 30, 1967 and Dec. 26, 1967 respectively, Ser. No. 693,143 being a continuation-in-part of Ser. No. 612,310; both of these applications are now abandoned.

DETAILED DESCRIPTION

The present invention pertains to compounds of the formula:

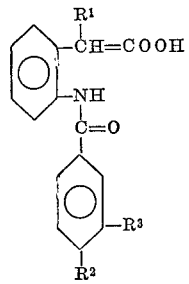

wherein
$R^1$ is hydrogen or methyl;
$R^2$ is chloro, fluoro or methoxy; and
$R^3$ is hydrogen or chloro, and to the pharmaceutically acceptable non-toxic salts thereof.

The present invention also pertains to methods and compositions utilizing the foregoing compounds for the purpose of effecting an anti-inflammatory response.

The substituted o-benzamidophenylacetic acids are prepared by hydrolysis of the corresponding esters which in turn are prepared by reacting an alkyl o-aminophenylacetate (prepared by reduction of the corresponding nitro compound) with the appropriately substituted benzoylchloride in a dry solvent.

Although the mechanism of the anti-inflammatory activity of these compounds is not fully understood, it appears it may in part be traceable to the ability of these compounds to suppress an immunological reaction. Thus while the compounds show activity in classical anti-inflammatory tests such as the anti-carrageenin test and turbidity model, they also show immunosuppressive activity in such assays an the Jerne Hemolytic Test. Thus these compounds in addition to the ability to reduce inflammation also suppress the action of powerful immunogens to an extent comparable to such immunosuppressive agents as azathioprine, 6-mercaptopurine and busulfan. Particularly active in this respect are those compounds of Formula 1 wherein $R^1$ is hydrogen, $R^2$ is chloro and $R^3$ is hydrogen or chloro.

The substituted o-benzamidophenylacetic acids of the present invention are administered parenterally or orally to achieve an anti-inflammatory effect, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions. The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the o-benzamidophenylacetic acid to a suitably fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulose or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dispersing the medicament in a non-toxic vehicle in which it is insoluble.

For parenteral administration, fluid unit dosage forms can be prepared by suspending or dissolving a measured amount of an o-benzamidophenylacetic acid in a non-toxic liquid vehicle suitable for injection such as an aqueous or oleaginous medium. Alternatively a measured amount of the compound is placed in a vial and the vial and its contents are sterilized and sealed. An accompanying vial or vehicle can be provided for mixing prior to administration.

One important embodiment of the present invention is the pharmaceutically acceptable non-toxic salts of sodium, potassium, calcium and organic amines with these substituted o-benzamidophenylacetic acids. Such amines include diethylamine, triethylamine, diethanolamine and the like.

The actual dosage employed in anti-inflammatory therapy will of course depend upon the nature and severity of the condition being treated, the age and health of the subject under therapy and the response observed. Thus while a significant anti-inflammatory response is observed from doses below 100 mg./kg. to over 300 mg./kg., the dose shield in all cases be titrated to the individual patient and administered in accordance with sound professional judgment.

The following examples will further illustrate the present invention but should not be construed as limiting the scope thereof in any way. Temperature is given in degrees centigrade.

PREPARATION

Methyl o-aminophenylacetate: o-Nitrophenyl acetic acid (10.8 g.) in ether (1 liter)/tetrahydrofuran (100 ml.) was treated with an ethereal solution of diazomethane (2.8 g./100 ml.). The solvents were evaporated by a current of air and the residual oil distilled: yield 7.7 g., B.P. 115–120°/0.2 mm.

The methyl ester of o-nitrophenylacetic acid (7.0 g.) was then dissolved in ethyl acetate (50 ml.) and hydrogenated at atmospheric pressure over platinum oxide. After removal of the catalyst, the solvent was evaporated under reduced pressure leaving methyl o-aminophenylacetate, a yellow oil (5.8 g.) which was used without further purification.

EXAMPLE 1

(A) Methyl o-(p-chlorobenzamido)phenylacetate

Methyl o-aminophenylacetate (5.0 g.) was dissolved in dry pyridine (25 ml.) and p-chlorobenzoyl chloride (5 ml.) added. After 15 minutes pyridine hydrochloride crystallized out. The reaction mixture was allowed to stand for a further 6 hours. The crystals were removed by filtration and a few drops of water added to the filtrate. The aqueous pyridine solution was kept overnight, poured into dilute sodium bicarbonate (150 ml.) and extracted with ether (5× 10 ml.). The ethereal extracts were washed (10× 100 ml.), dried over anhydrous magnesium sulfate and the solvent evaporated to dryness under reduced pressure leaving a beige solid. Recrystallization from ethanol yielded colorless needles (4.7 g., 52%): M.P. 108–109°.

Analysis.—Calcd. for $C_{16}H_{14}ClNO_3$ (percent): C, 63.33; H, 4.65; N, 4.61; Cl., 11.68. Found (percent): C, 62.97; H, 4.59; N, 4.60; Cl, 11.78.

(B) o-(p-Chlorobenzamido)phenylacetic acid

Methyl o-(p-chlorobenzamido)phenylacetate (11.0 g.) and 1 N sodium hydroxide (200 ml.) were heated under reflux until a homogeneous solution was obtained (circa 1 hour). On cooling the reaction on ice, a white solid crystallized out (sodium salt) which redissolved on the addition of more water (200 ml.) and gentle warming. The solution was acidified (pH 5) with 10% hydrochloric acid, the product collected by filtration, dried in vacuo and crystallized from ethanol as colorless needles (9.0 g., 86%), M.P. 184.5°.

Analysis.—Calcd. for $C_{15}H_{12}ClNO_3$ (percent): C, 62.17; H, 4.18; N, 4.84; Cl, 12.26. Found (percent): C, 61.93; H, 3.90; N, 4.92; Cl, 12.27.

EXAMPLE 2

(A) Methyl o-(p-methoxybenzamidophenylacetate

Methyl o-aminophenylacetate (15 g.) was dissolved in anhydrous pyridine (60 ml.) and p-methoxybenzoyl chloride (20 g.) added in small portions, with stirring and maintaining the reaction temperature below 15° C. On completion of the addition, the reaction was allowed to stand for 3 hours at room temperature, the pyridine hydrochloride separated by filtration, and water added to the filtrate, until precipitation of the product occurred. This was separated by filtration and recrystallized from ethanol as colorless needles (10.3 g., 38%), M.P. 113–114°.

Analysis.—Calcd. for $C_{17}H_{17}NO_4$ (percent): C, 68.21; H, 5.73; N, 4.68. Found (percent): C, 67.96; H, 5.63; N, 4.95.

(B) o-(p-Methoxybenzamido)phenylacetic acid

Methyl o-(p-methoxybenzamido)phenylacetate (25 g.) and N-sodium hydroxide (500 ml.) were heated under reflux until a homogenous solution was obtained. The reaction mixture was charcoaled, filtered, cooled to 10° C. and acidified (pH 3) with 2 N hydrochloric acid. The precipitated product was collected by filtration and twice recrystallized from aqueous ethanol as colorless needles (15 g., 16%), M.P. 189–90°.

Analysis.—Calcd. for $C_{16}H_{15}NO_4$ (percent): C, 67.36; H, 5.30; N, 4.91. Found (percent): C, 67.24; H, 5.32; N, 4.90.

EXAMPLE 3

(A) Methyl o-(3,4-dichlorobenzamido)phenylacetate

Methyl o-aminophenylacetate (18 g.) was dissolved in dry pyridine (100 ml.) and 3,4-dichlorobenzoyl chloride (23 g.) was added dropwise with stirring. The temperature of the reaction was maintained below 20° C. After 15 minutes pyridine HCl began to separate, and the reaction was allowed to stir for an additional 6 hours. The pyridine HCl was separated by filtration and a few drops of water were added to the filtrate. The aqueous pyridine solution was allowed to stand overnight, poured into 5% NaHCO₃ (500 ml.) and extracted with ether (3× 700 ml.). The combined ethereal extracts were washed (10× 400 ml.) dried (MgSO₄) and the solvent evaporated under reduced pressure leaving a white solid (13.0 g., 36%), M.P. 112–113°.

Analysis.—Calcd. for $C_{16}H_{13}Cl_2NO_3$ (percent): C, 56.79; H, 3.88; N, 4.15; Cl, 20.58. Found (percent): C, 56.75; H, 3.81; N, 4.16; Cl, 21.11.

(B) p-(3,4-dichlorobenzamido)phenylacetic acid

Methyl o-(3,4-dichlorobenzamido)phenylacetate (13.0 g.) in methanol (50 ml.) and 1 N NaOH (250 ml.) was heated under reflux for ½ hour. The methanol was removed by distillation, and the aqueous solution was charcoaled, cooled, filtered and acidified with 6 N HCl (pH 1), to yield a pinkish precipitate. This was separated by filtration and crystallized from aqueous ethanol as long colorless needles (3.0 g., 24%), M.P. 174–6°.

*Analysis.*—Calcd. for $C_{15}H_{11}Cl_2NO_3$ (percent): C, 55.59; H, 3.42; N, 4.32; Cl, 21.86. Found (percent): C, 55.33; H, 3.14; N, 4.29; Cl, 22.09.

EXAMPLE 4

(A) Methyl o-(p-fluorobenzamido)phenylacetate

Methyl o-aminophenylacetate (25 g.) was dissolved in dry pyridine (200 ml.) and p-fluorobenzoyl chloride (32 g.) added, maintaining the reaction temperature below 20° C. After 15 minutes, pyridine HCl crystallized out and the reaction was allowed to stand for a further 6 hours at room temperature. The pyridine HCl was then separated by filtration, and a few drops of water added to the filtrate. The aqueous pyridine solution was allowed to stand overnight, poured into 5% NaHCO₃ (300 ml.) and extracted with ether (2× 500 ml.). The combined ethereal extracts were washed (10× 500 ml.), dried over MgSO₄ and the solvent removed under reduced pressure leaving an off-white solid. This was washed well with cold ether to remove any traces of pyridine (Yield—19.2 g., 44%), M.P. 97.8°.

*Analysis.*—Calcd. for $C_{16}H_{14}FNO_3$ (percent): C, 66.90; H, 4.91; N, 4.88; F, 6.61. Found (percent): C, 66.73; H, 4.81; N, 4.81; F, 6.70.

(B) o-(p-fluorobenzamido)phenylacetic acid

Methyl o-(p-fluorobenzamido)phenylacetate 9.5 g.) and N sodium hydroxide (150 ml.) were combined and heated under reflux until an homogenous solution was obtained. This was charcoaled, cooled to room temperature and acidified with 10% HCl. The product was collected by filtration and recrystallized from aqueous ethanol as colorless needles (6.8 g., 75%), M.P. 176.7°.

*Analysis.*—Calcd. for $C_{15}H_{12}FNO_3$ (percent): C, 65.87; H, 4.43; N, 5.12; F, 6.95. Fond (percent): C, 65.86; H, 4.40; N, 5.11; F, 7.03.

EXAMPLE 5

(A) d,l,o-(p-chlorobenzamido)-α-methylphenylacetate

Nitro-*a*-methylphenylacetic acid (80 g.), prepared from hydratropic acid (80 g.) by the method of Trinius, Ann. 227, 262, absolute methanol (500 ml.) and conc. H₂SO₄ (5 ml.) were combined and heated under reflux for two hours. On cooling, the reaction mixture was rendered basic with 10% NH₄OH, diluted with water to 8 times the original volume (to 4 l.) and extracted with ether. The ethereal extracts were dried (Na₂SO₄) and the solvent evaporated under reduced pressure yielding a yellow oil (70 g.) of methyl o-nitro-*a*-methylphenylacetate. Distillation yielded a pale yellow oil (68 g.). B.P. 107–114°/0.04–05 mm.

Methyl o - nitro - α - methylphenylacetate (2.5 g., 0.012 mole) was dissolved in ethyl acetate (100 ml.) and hydrogenated at atmospheric pressure using 5% Pd/BaSO₄ (1 g.) as catalyst. After removal of the catalyst, the solution was dried (MgSO₄) and the solvent evaporated under reduced pressure yielding a pale yellow oil (2.2 g.) being methyl o-amino-*a*-methylphenylacetate which was used in the next step without further purification or characterization.

Methyl o-amino-α-methylphenylacetate (2.2 g.) was dissolved in dry pyridine (50 ml.) and p-chlorobenzoyl chloride (2.1 g.) added dropwise with stirring. During the addition, the temperature of the reaction was maintained below 20° C. On completion of the addition, the mixture was allowed to stir at room temperature for 30 minutes during which time pyridine HCl crystallized out. Water (7 ml.) was added to the reaction and the solution allowed to stand overnight at room temperature. Water (100 ml.) was then added and the reaction mixture basified (pH 8) with 5% NaHCO₃, and extracted with ether (2× 80 ml.). The combined etheral extracta were dried (MgSO₄), and the solvent evaporated under reduced pressure to yield a pale yellow solid (3.3 g., 84%), which was methyl o-(p-chlorobenzamido)-α-methylphenylacetate having a M.P. of 120–121°, which was used in the next step without further purification.

(B) d,l-o-(p-chlorobenzamido-α-methylphenylacetic acid

Methyl o-(p-chlorobenzamido)-α-methylphenylacetate (3.3 g.) and N sodium hydroxide (100 ml.) were combined and warmed on a steam bath until a homogenous solution was obtained. The solution was filtered, cooled to room temperature and acidified with 3 N hydrochloric acid. The product was precipitated as a sticky solid. The supernatant liquid was decanted and the residue dissolved in a minimum of hot ethanol. On the addition of water, the product precipitated, and was collected by filtration, and recrystallized once more from aqueous ethanol as colorless prisms, (1.9 g., 60%), M.P. 161–3° C.

*Analysis.*—Calcd. for $C_{16}H_{14}ClNO_3$ (percent): C, 63.22; H, 4.65; N, 4.62; Cl, 11.08. Found (percent): C, 63.19; H, 4.73; N, 4.44; Cl, 11.75.

EXAMPLE 6

| Ingredient: | Quantity/capsule, mg. |
|---|---|
| o-(p-chlorobenzamido)phenylacetic acid | 100 |
| Corn starch U.S.P | 200 |

The ingredients are mixed and introduced into a two-piece hard gelatin No. 1 capsule.

EXAMPLE 7

| Ingredient: | Quantity/tablet, mg. |
|---|---|
| o-(p-chlorobenzamido)phenylacetic acid | 100 |
| Corn starch U.S.P. | 150 |
| Lactose U.S.P. | 180 |
| Carb-O-Sil M–5 | 4 |
| Gelatin U.S.P. | 5 |
| Magnesium stearate U.S.P. | 1 |

The above ingredients after being thoroughly mixed, are pressed into single scored tablets.

What is claimed is:

1. An anti-inflammatory composition comprising in dosage unit form a pharmaceutical carrier and an effective anti-inflammatory amount of a compound of the formula

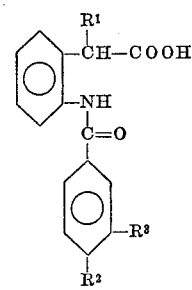

wherein
R¹ is hydrogen or methyl;
R² is chloro, fluoro or methoxy, and
R³ is hydrogen or chloro.

2. An anti-inflammatory composition according to claim 1, wherein said compound is o-(p-chlorobenzamido)phenylacetic acid.

3. An anti-inflammatory composition according to claim 1, wherein said compound is o-(p-methoxybenzamido)phenylacetic acid.

4. An anti-inflammatory composition according to claim 1, wherein said compound is o-(3,4-dichlorobenzamido)phenylacetic acid.

5. An anti-inflammatory composition according to claim 1, wherein said compound is o-(p-fluorobenzamido)-phenylacetic acid.

6. An anti-inflammatory composition according to claim 1, wherein said compound is o-(p-chlorobenzamido)-α-methylphenylacetic acid.

7. A method for treating inflammation in a mammal which comprises administering thereto an effective anti-inflammatory amount of a compound of the formula

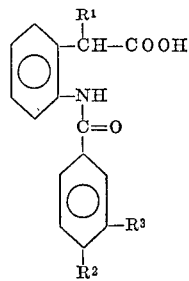

wherein $R^1$ is hydrogen or methyl;

$R^2$ is chloro, fluoro or methoxy, and $R^3$ is hydrogen or chloro.

8. A method according to claim 7 wherein said compound is o-(p-chlorobenzamido)phenylacetic acid.

9. A method according to claim 7 wherein said compound is o-(p-methoxybenzamido)phenylacetic acid.

10. A method according to claim 7 wherein said compound is o-(3,4-dichlorobenzamido)phenylacetic acid.

11. A method according to claim 7 wherein said compound is o-(p-fluorobenzamido)phenylacetic acid.

12. A method according to claim 7 wherein said compound is o-(p-chlorobenzamido) - α - methylphenylacetic acid.

References Cited

UNITED STATES PATENTS 3,397,211   8/1968   Gal _____ 260—518

JEROME D. GOLDBERG, Examiner